INVENTOR.
Jerold W. Scheel
BY
W. J. Wagner
ATTORNEY

United States Patent Office 3,318,406
Patented May 9, 1967

3,318,406
LOAD COMPENSATING AIR CUSHION SUPPORT
Jerold W. Scheel, Santa Barbara, Calif., assignor to General Motors Corporation, Detroit, Mich., a corporation of Delaware
Filed May 11, 1965, Ser. No. 454,939
7 Claims. (Cl. 180—7)

This invention relates to air cushion devices and more particularly to air cushion load supporting devices of the type in which a single convolution annular flexible membrane is secured peripherally and centrally beneath a substantially rigid load supporting platform.

In copending application Ser. No. 4.465, Harry A. Mackie et al., assigned to General Motors Corporation, and which has since become abandoned, there is disclosed an air cushion device of the general type described wherein a generally horizontally extending flexible membrane is attached centrally and peripherally to a rigid load supporting surface so as to form a depending perimetrical convolution surrounding a central plenum cavity. One or more openings are formed in the membrane at or near the central connection with the load supporting surface so that when the device is energized by a suitable source of air pressure, corresponding superatmospheric pressure is induced in both the plenum cavity and the annular chamber formed between the load supporting surface and the depending convolution. One of the features of the device disclosed in the above-noted application is the provision for adjusting the vertical level at which the central portion of the membrane is restrained relative to the load supporting surface. As described and illustrated in this application, it is known that for a given load supported thereon and with a constant volume output source of air, the operating altitude of the load supporting platform will vary according to the adjusted level of the central portion of the membrane.

The present invention is concerned with improvements in the air cushion device disclosed in the Mackie et al. application whereby the adjusted level of the central portion of the membrane varies automatically responsive to changes in load imposed on the supporting platform, without resort to so-called "height sensing" devices of the type which mechanically measure the distance from the platform to the surface over which it operates. According to the general features of the invention, the center of the membrane is yieldably restrained vertically relative to the platform by suitable elastic means having a predetermined spring rate effective to permit progressive descent of the central portion as the load on the platform is progressively increased.

An object of the invention is to provide an improved air cushion device.

A further object is to provide an air cushion device including altitude regulating means which operates in direct response to change in load imposed on the device.

A still further object is to provide a self-modulating flexible choke air cushion device including a single convolution annular membrane which is positively connected at its outer periphery to a load supporting platform and impositively connected centrally thereto by a yielding connection calibrated so as to respond in vertical descent to increased tension exerted on the membrane as an incidence of increase in load on the device.

Still another object is to provide an arrangement of the general type described in which the yielding connection includes damping means acting in the direction of displacement of the yielding connection.

These and other objects, advantages and features of the invention will become more readily apparent as reference is had to the accompanying specification and drawing wherein.

Figure 1:
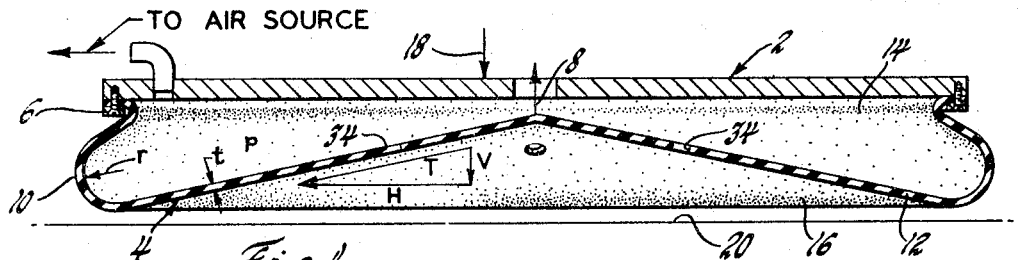
FIGURE 1 is a schematic sectional elevation of an air cushion device of the general type to which the invention relates, together with a force diagram related thereto.

Referring now to the drawing and particularly FIGURE 1, there is shown schematically an air cushion device of the type generally designated as a self-modulating flexible choke air bearing wherein the reference numeral 2 indicates a substantially rigid load supporting platform having disposed therebeneath a generally horizontal single convolution flexible membrane 4 which is sealed peripherally at 6 to the platform 2 and vertically restrained centrally at 8 relative to the platform. Characteristic of this device is the formation of a circumferential radius portion 10 merging with a lower surface proximate wall portion 12 which due to the central connection at 8 assumes a generally frusto-conical form when the interior of annular chamber 14 and the plenum chamber 16 are subjected to superatmospheric pressure. When a device of this type is subjected to a load 18 and operated over a surface 20, it is known, as previously noted, that the level of the platform 2 may be changed by altering the vertical level of the center of wall portion 12 with respect to the platform 2. Thus for a given load, as the center of the membrane is lowered relative to the platform, the height of the latter above the surface 20 progressively rises. Conversely, it is also known that for a fixed position of the center of the membrane relative to the platform, as load on the device is progressively increased, the level of the platform progressively decreases relative to the surface 20.

A force balance analysis of an operating device has shown that at all loads a force exists which tends to pull the center retainer downwardly from the platform. It has been determined that this force is a function of the radial tension imposed on the lower membrane wall portion 12 which is represented by the expression $$T = \frac{pr}{t}$$

where $p$ = pressure in chamber 14; $r$ = radius 10; and $t$ = membrane thickness. While the tension so produced on wall portion 12 is predominantly horizontal, as will be evident from the vector diagram a vertical component exists which represents the force tending to pull the center of the membrane away from the platform 2. Although the radius 10 decreases slightly with increase in load, the pressure within chamber 14 increases directly with the load so that the net vertical component V of the force T progressively increases with load.

Based on the foregoing together with the known fact that adjustment in the vertical level of the center of the membrane resulting in an increase in height of the platform, it was discovered that the platform could be maintained at a substantially uniform height above the surface over which it was operating irrespective of changes in load thereon by effecting restraint of the central portion of the membrane through the medium of a yielding connection having a spring rate properly correlated with the change in the vertical component of the tension exerted on the membrane.

Figure 2:
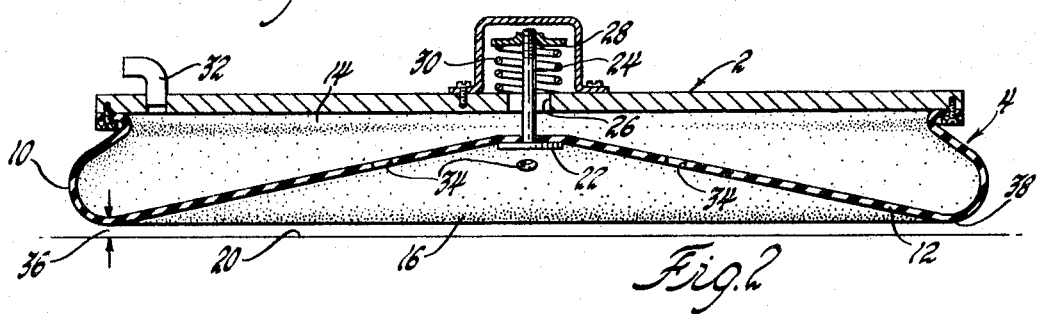
FIGURE 2 is a sectional elevational view of an air cushion device incorporating one form of the invention.

In FIGURE 2 there is shown one embodiment of the invention wherein the central portion of the membrane is connected to the lower end 22 of a stem member 24 which extends upwardly through an aperture 26 in the platform 2 and engages a threaded disc 28. Disc 28 in turn abuttingly engages the upper end of a compression spring 30 seated on platform 2. In this embodiment, initial adjustment of the level of the central portion of the membrane relative to platform 2 is accomplished by threadably adjusting disc 28 upwardly or downwardly on stem 24. In operation of the device superatmospheric air derived from a constant volume source, not shown, passes through conduit 32 into chamber 14, inflates the latter and elevates the platform. Subsequent flow of air emerges through openings 34 in lower wall 12 into plenum cavity 16 forming a superatmospheric cushion of air between the lower wall 12 and surface 20 bounded by a perimetrical flexible choke or throttling gap 36 formed between the lowermost level 38 of the membrane and the surface 20. Gap 36 acts to regulate the radial discharge rate of air to maintain optimum air cushion in plenum 16 for a given load on platform 2. In accordance with the invention, when additional load is imposed on platform 2, the level of the center of lower wall 12 will descend as load induced in tension on member 22 exerts a compressing force on spring 30 through stem 24.

Figure 3:
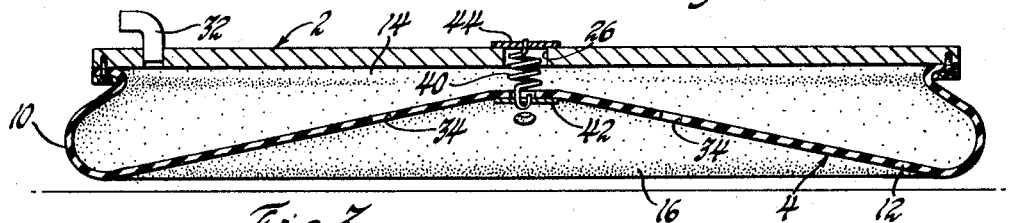
FIGURE 3 is a view similar to FIGURE 2 showing a modified form of the invention.

The embodiment shown in FIGURE 3 corresponds generally to that of FIGURE 2 except for the substitution of a tension type coil spring 40 connected respectively between a lower plate 42 secured to the center of membrane 12 and an upper plate 44 resting on platform 2 over aperture 26.

Figure 4:
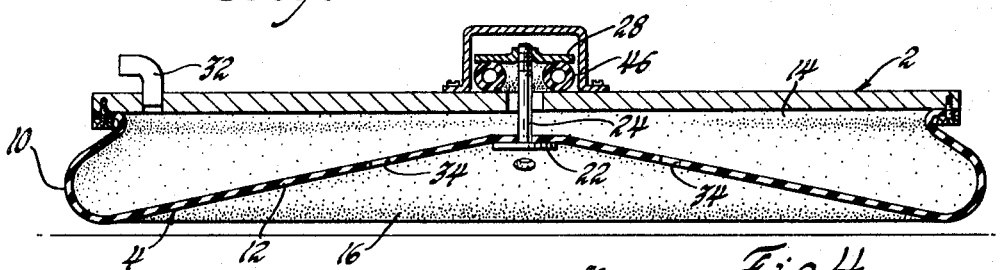
FIGURE 4 is a view similar to FIGURE 2 showing a further modification of the invention.

In FIGURE 4 there is shown a further modification of the invention corresponding essentially to the structure of FIGURE 2 which, however, utilizes a variable rate spring 46 in the form of a hollow inflated flexible annulus in lieu of the constant rate springs utilized in the structure of FIGURE 2.

Figure 5:
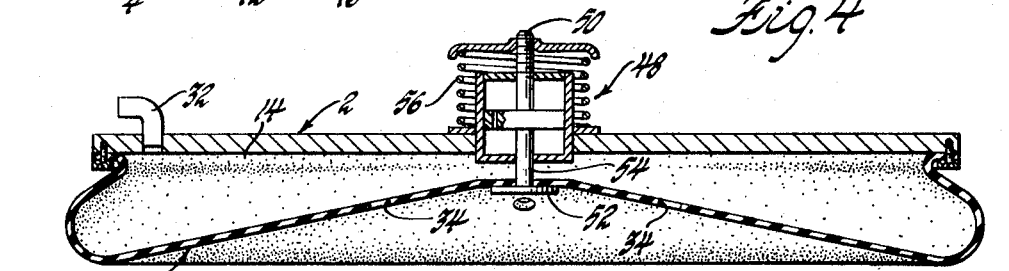
FIGURE 5 is a view similar to FIGURE 2 showing a still further modification of the invention.

In FIGURE 5 there is shown a further modification of the invention wherein a rectilinear damping device 48 is interposed between the upper and lower ends 50 and 52 of a stem 54 so that transient change in load imposed on platform 2 does not immediately induce deflection of compression spring 56. With this construction, the device provides the additional benefit of inhibiting any unstable vertical oscillations which may be generated during operation of the device.

From the foregoing it will be seen that a simple, effective and extremely useful improvement in air cushion devices has been achieved. A construction according to the invention not only enables maintenance of substantially uniform platform height throughout a significant range of load variation, but in addition, if desired, may also be utilized to achieve a condition wherein the load supporting platform actually ascends relative to the operating surface as the load thereon is increased. That is, a spring rate for the center retainer may be selected which is not in unity ratio with the change in tension and, therefore, allow the center to descend more than is required to maintain the uniform platform height. Under these conditions, the platform will automatically ascend relative to the operating surface as the load on the platform increases.

While several embodiments of the invention have been shown and described, it will be apparent that other changes and modifications may be made therein. It is, therefore, to be understood that it is not intended to limit the invention to the embodiments shown, but only by the scope of the claims which follow.

I claim:
1. A fluid cushion load supporting device comprising, a hollow body including a substantially inflexible upper wall and a dished flexible lower wall disposed in proximate relation to a surface and forming a plenum chamber therebetween, means providing communication between said hollow body and said plenum chamber, and spring means extending between said inflexible wall and the central portion of said flexible lower wall acting to permit progressive downward displacement of said central portion in response to progressive increase in load imposed on said device.

2. The invention of claim 1 including means for damping deflection of said spring.

3. The invention of claim 1 wherein said spring means exhibits a constant load versus deflection rate.

4. The invention of claim 1 wherein said spring means exhibits a variable load versus deflection rate.

5. In a superambient pressure energized ground proximate air cushion device, the combination of a load supporting surface having a flexible membrane disposed thereunder forming a depending annular chamber surrounding and communicating with a peripherally choked ground proximate plenum cavity, spring means disposed between said load supporting surface and the center of said membrane yieldably restraining vertical deflection of the latter, the deflection rate of said spring means being calibrated so that the vertical level of said center varies according to increase and decrease in load imposed on said supporting surface.

6. In a superambient pressure energized ground proximate air cushion device, the combination of a load supporting surface having a flexible membrane disposed thereunder forming a depending annular chamber surrounding and communicating with a peripherally choked ground proximate plenum cavity, pressure responsive means disposed between said surface and the center of said membrane operative to progressively lower the level of the latter relative to the former as the effective diameter of said peripheral choke increases with increased load on said surface, and progressively raise said level as the effective diameter of said peripheral choke decreases with decreasing load thereon, whereby to maintain said platform at a substantially constant level above the ground irrespective of change in load thereon.

7. The structure set forth in claim 6 wherein said means for progressively raising and lowering the level of the center of said membrane operates as a direct function of variation in tension exerted on said membrane by variation in load on said device.

References Cited by the Examiner

UNITED STATES PATENTS 3,253,667 5/1966 Mackie _____ 180—7

FOREIGN PATENTS 924,834 5/1963 Great Britain.

A. HARRY LEVY, *Primary Examiner.*